(12) United States Patent
Tanaka et al.

(10) Patent No.: US 8,702,545 B2
(45) Date of Patent: *Apr. 22, 2014

(54) POWER TRANSMISSION SYSTEM FOR USE IN VEHICLE

(71) Applicant: Denso Corporation, Kariya (JP)

(72) Inventors: Eitarou Tanaka, Nagoya (JP); Takahiro Narita, Nagoya (JP); Tetsuya Nagata, Konan (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,968

(22) Filed: Jun. 25, 2013

(65) Prior Publication Data

US 2013/0288851 A1    Oct. 31, 2013

Related U.S. Application Data

(63) Continuation of application No. 12/938,576, filed on Nov. 3, 2010, now Pat. No. 8,496,553.

(30) Foreign Application Priority Data

Nov. 5, 2009  (JP) ................................. 2009-254231

(51) Int. Cl.
*F16H 3/72* (2006.01)

(52) U.S. Cl.
USPC ........................................................... 475/5

(58) Field of Classification Search
USPC ........................................................... 475/5
See application file for complete search history.

(56) References Cited

U.S. PATENT DOCUMENTS

| | | | | |
|---|---|---|---|---|
| 3,870,116 A | * | 3/1975 | Seliber | 180/165 |
| 3,923,115 A | * | 12/1975 | Helling | 180/65.25 |
| 4,126,200 A | * | 11/1978 | Miller et al. | 180/165 |
| 4,171,029 A | * | 10/1979 | Beale | 180/54.1 |
| 4,411,171 A | * | 10/1983 | Fiala | 475/5 |
| 4,423,794 A | | 1/1984 | Beck | |
| 4,471,668 A | * | 9/1984 | Elsner | 475/72 |
| 4,519,485 A | * | 5/1985 | Greenwood | 477/2 |

(Continued)

FOREIGN PATENT DOCUMENTS

| | | |
|---|---|---|
| DE | 24 41 583 | 3/1976 |
| JP | S58-045921 | 3/1983 |

(Continued)

OTHER PUBLICATIONS

Partial European Search Report dated Feb. 24, 2011, issued in corresponding European Application No. 10188357.7-2421.

(Continued)

Primary Examiner — Dirk Wright
(74) Attorney, Agent, or Firm — Nixon & Vanderhye PC

(57) ABSTRACT

The power transmission system for use in a vehicle includes a power split device to perform power distribution among a flywheel for storing rotational energy as mechanical energy, an internal combustion engine and an electric rotating machine. The power transmission system is provided with an interrupting device configured to interrupt power transmission between a group of the flywheel and the electric rotating machine and a group of the internal combustion engine and drive wheels of the vehicle when rotational energy stored in the flywheel is transmitted to the electric rotating machine through the power split device under condition that power is transmitted between the internal combustion engine and the drive wheels.

12 Claims, 14 Drawing Sheets

(56) References Cited

U.S. PATENT DOCUMENTS

| | | | |
|---|---|---|---|
| 4,525,661 A * | 6/1985 | Mucsy et al. | 322/4 |
| 4,583,505 A * | 4/1986 | Frank et al. | 123/198 F |
| 4,588,040 A * | 5/1986 | Albright et al. | 180/165 |
| 4,625,823 A * | 12/1986 | Frank | 180/165 |
| 4,679,646 A * | 7/1987 | Greenwood | 180/165 |
| 5,569,108 A * | 10/1996 | Cadee et al. | 475/1 |
| 5,815,907 A * | 10/1998 | Gunsallus et al. | 29/598 |
| 6,024,667 A * | 2/2000 | Krohm et al. | 477/6 |
| 6,573,626 B1 * | 6/2003 | Gosebruch et al. | 310/74 |
| 6,668,953 B1 * | 12/2003 | Reik et al. | 180/53.8 |
| 7,341,534 B2 | 3/2008 | Schmidt | |
| 7,540,346 B2 * | 6/2009 | Hu | 180/165 |
| 7,967,714 B2 * | 6/2011 | Van Druten et al. | 475/211 |
| 8,206,252 B2 * | 6/2012 | Dusenberry et al. | 475/5 |
| 2007/0219038 A1 | 9/2007 | Druten et al. | |
| 2010/0184549 A1 * | 7/2010 | Sartre et al. | 475/5 |
| 2011/0106359 A1 | 5/2011 | Tanaka | |

FOREIGN PATENT DOCUMENTS

| | | |
|---|---|---|
| JP | P2005-207386 | 8/2005 |
| JP | 2006-232162 | 9/2006 |
| JP | P2007-082323 A | 3/2007 |
| JP | 2009-143485 | 7/2009 |
| WO | WO 2006/043812 | 4/2006 |
| WO | WO 2009/010819 | 1/2009 |

OTHER PUBLICATIONS

Mathijsen, "Torque Reaction", Automotive Engineer Professional Engineering Publishing, London GB, vol. 28, No. 10, Nov. 2003, pp. 55, 56 and 59.

Japanese Office Action dated Aug. 2, 2011, issued in corresponding Japanese Application No. 2009-254231 with English translation.

* cited by examiner

FIG. 2A  WHEN VEHICLE IS STATIONARY
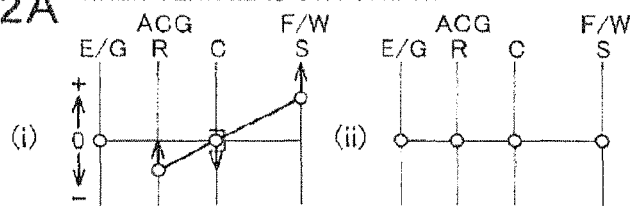
FIG. 2B  WHEN ENGINE IS STARTED
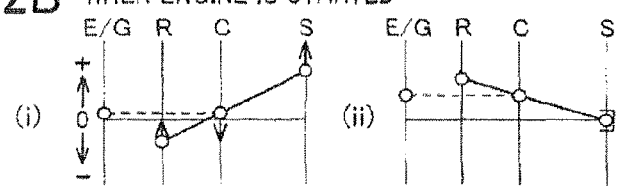
FIG. 2C  WHEN VEHICLE STARTS MOVING OR IS RUNNING UNDER LIGHT LOAD
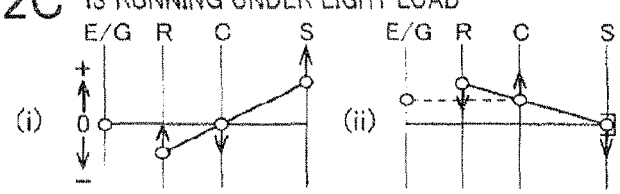
FIG. 2D  WHEN VEHICLE RUNS STEADILY
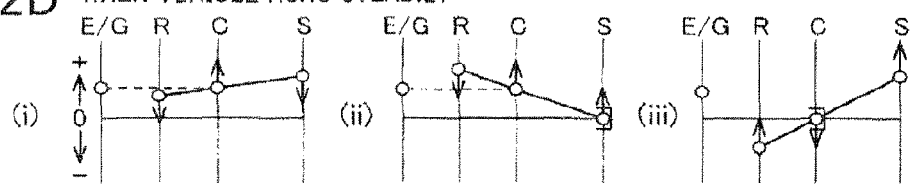
FIG. 2E  WHEN VEHICLE ACCELERATES
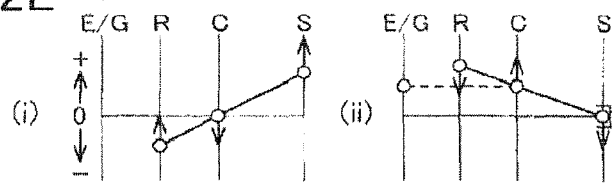
FIG. 2F  WHEN ENERGY IS REGENERATED
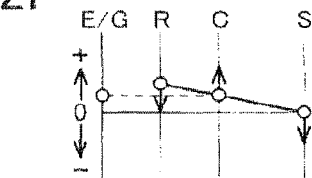

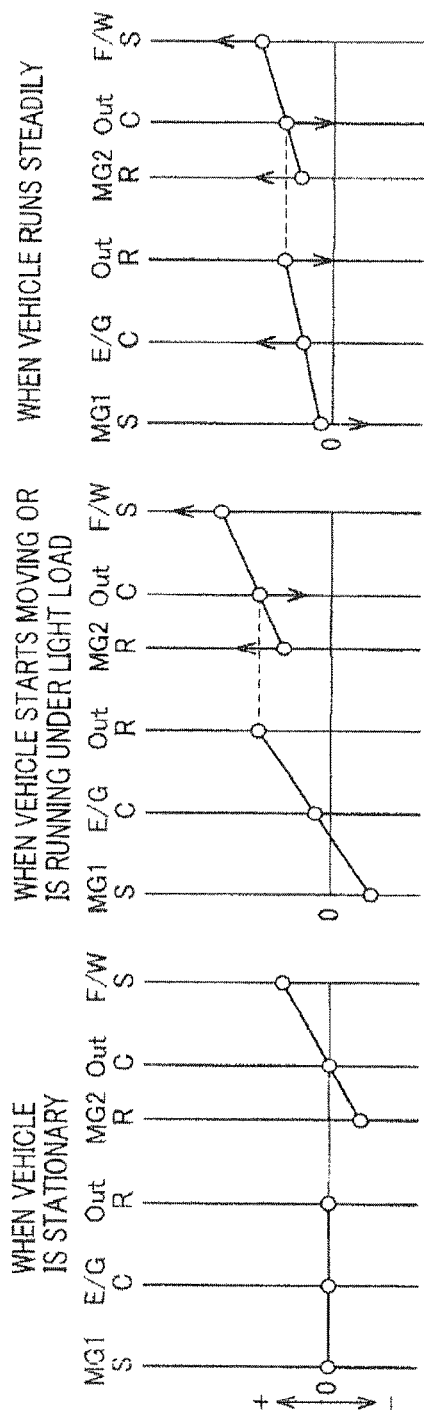
FIG.9A WHEN VEHICLE IS STATIONARY
FIG.9B WHEN VEHICLE STARTS MOVING OR IS RUNNING UNDER LIGHT LOAD
FIG.9C WHEN VEHICLE RUNS STEADILY
FIG.9D WHEN VEHICLE ACCELERATES
FIG.9E WHEN ENERGY IS REGENERATED

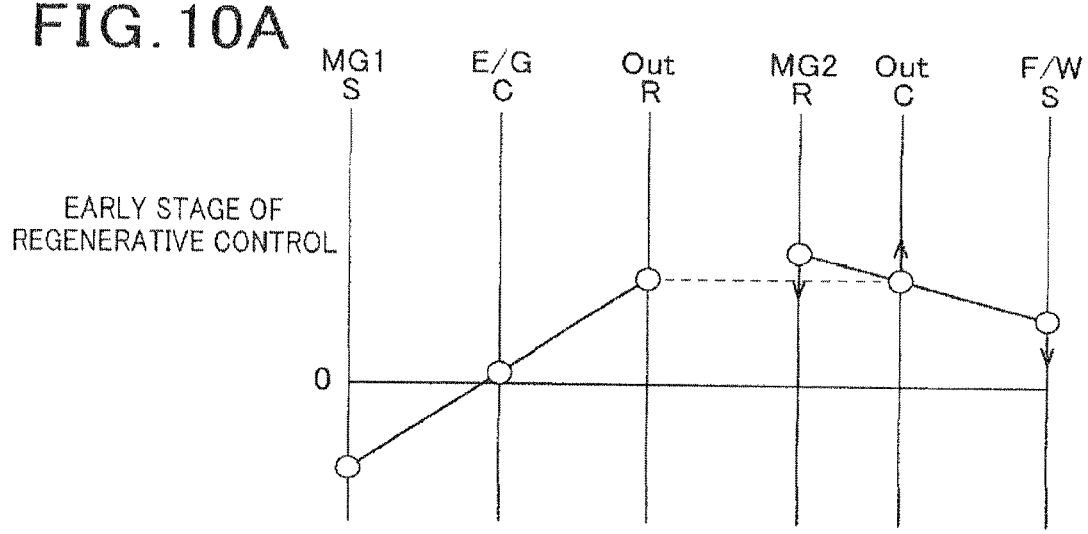
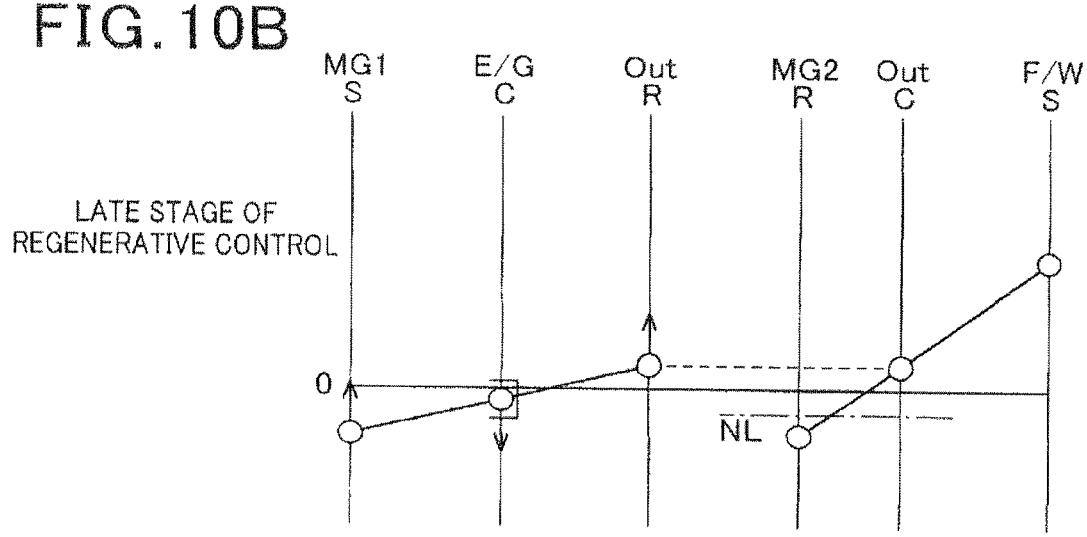

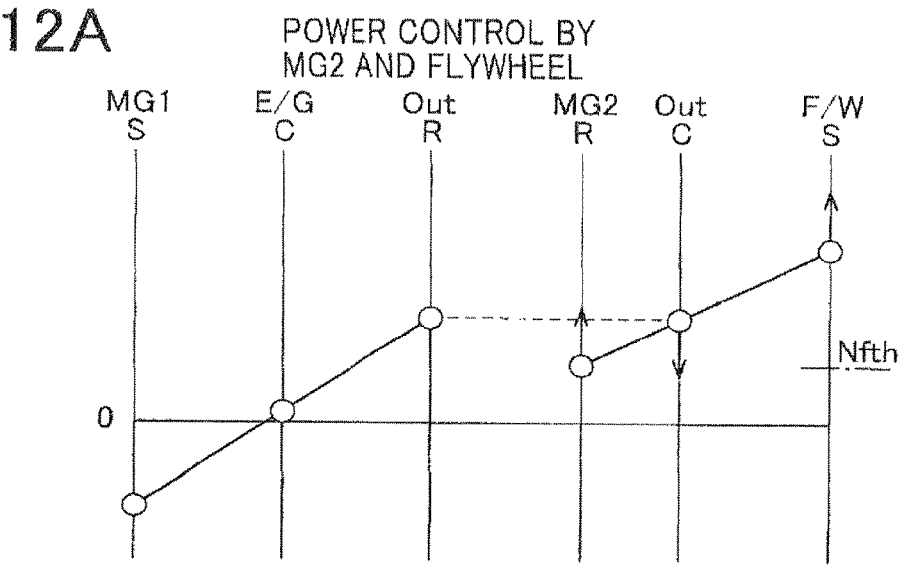
FIG. 12A POWER CONTROL BY MG2 AND FLYWHEEL
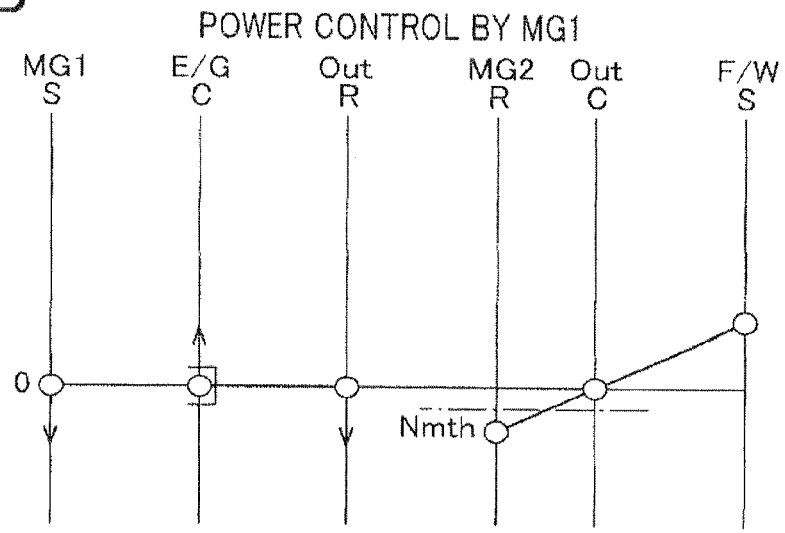
FIG. 12B POWER CONTROL BY MG1

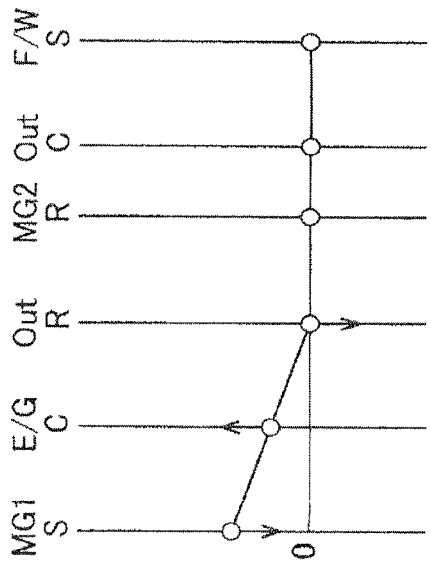
FIG. 14A WHEN VEHICLE HAS BEEN STOPPED FOR A LONG TIME
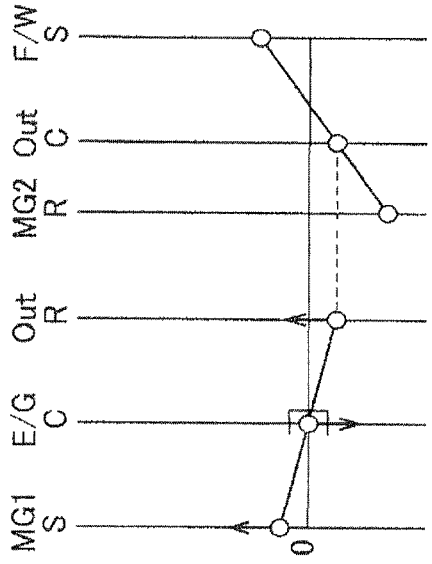
FIG. 14C WHEN VEHICLE IS STOPPED WITH SMALL SOC
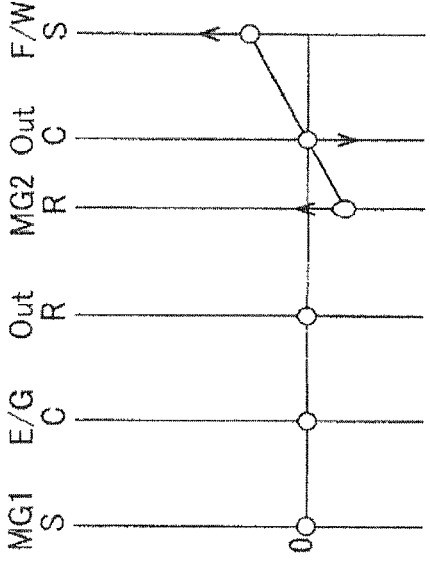
FIG. 14B WHEN ENGINE IS STARTED WITH SMALL ROTATIONAL ENERGY
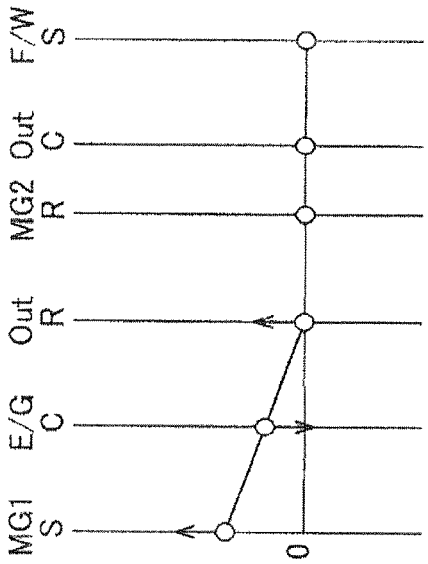
FIG. 14D WHEN VEHICLE RUNS BACKWARD

POWER TRANSMISSION SYSTEM FOR USE IN VEHICLE

This application is a continuation of application Ser. No. 12/938,576, filed Nov. 3, 2010, and claims priority from Japanese Patent Application No. 2009-254231 filed on Nov. 5, 2009, the contents of each of which are incorporated herein by reference.

BACKGROUND OF THE INVENTION

1. Field of the Invention

The present invention relates to a power transmission system for use in a vehicle including a power split device which performs power distribution among a flywheel for storing rotational energy as mechanical energy, an internal combustion engine and an electric rotating machine.

2. Description of Related Art

As such a power transmission system, there is the one in which a planetary gear device performs power distribution of the power between a transmission coupled to drive wheels and an internal combustion engine, the power of a flywheel, and the power of an electric rotating machine. For example, refer to International Patent Application Publication No. WO 2009/010819. According to this system, it is possible to store torque of the drive wheels in the flywheel or the electric rotating machine through the transmission.

However, the above conventional system has a problem in that it may occur that a vehicle-mounted battery cannot be charged properly by electric energy which the electric rotating machine generates by converting the rotational energy stored in the flywheel into electric energy while the vehicle runs, because the conversion by the electric rotating machine is affected by the rotational speed of the drive wheels.

SUMMARY OF THE INVENTION

The present invention provides a power transmission system for use in a vehicle comprising:
a power split device to perform power distribution among a flywheel for storing rotational energy as mechanical energy, an internal combustion engine and an electric rotating machine; and
an interrupting device to interrupt power transmission between a group of the flywheel and the electric rotating machine and a group of the internal combustion engine and drive wheels of the vehicle when rotational energy stored in the flywheel is transmitted to the electric rotating machine through the power split device under condition that power is transmitted between the internal combustion engine and the drive wheels.

The present invention also provides a power transmission system for use in a vehicle comprising:
a first power split device including a first rotating body mechanically coupled to a first electric rotating machine, a second rotating body mechanically coupled to drive wheels of the vehicle and a third rotating body mechanically coupled to an internal combustion engine of the vehicle, and configured to perform power distribution among the first electric rotating machine, the drive wheels and the internal combustion engine; and
a second power split device including a fourth rotating body mechanically coupled to a flywheel for storing rotational energy as mechanical energy, a fifth rotating body mechanically coupled to a second electric rotating machine, and a sixth rotating body mechanically coupled to one of the first to third rotating bodies of the first power split device to perform power distribution among the flywheel, the second electric rotating machine and the first power split device.

According to the present invention, there is provided a power transmission apparatus for use in a vehicle of the type including a power split device to perform power distribution among a flywheel to store rotational energy as mechanical energy, an internal combustion engine and an electric rotating machine, which is capable of properly charging a vehicle battery using rotational energy stored in the flywheel to thereby make an effective use of regenerative energy.

Other advantages and features of the invention will become apparent from the following description including the drawings and claims.

BRIEF DESCRIPTION OF THE DRAWINGS

In the accompanying drawings:

FIGS. 2A to 2F are collinear diagrams of rotational speeds of rotating bodies included in the power split device of the power transmission system;

FIGS. 9A to 9E are collinear diagrams of rotational speeds of rotating bodies included in a power split device of the power transmission system according to the seventh embodiment of the invention;

FIGS. 10A and 10B are collinear diagrams of the rotational speeds of the rotating bodies when the power transmission system of the seventh embodiment is in a regenerative control mode;

FIGS. 12A and 12B are collinear diagrams of the rotational speeds of the rotating bodies when the power transmission system of the seventh embodiment is in an EV-running mode;

FIGS. 14A to 14D are collinear diagrams of the rotational speeds of the rotating bodies included in the power split device of the power transmission system according to the seventh embodiment of the invention.

PREFERRED EMBODIMENTS OF THE INVENTION

First Embodiment

Figure 1A:
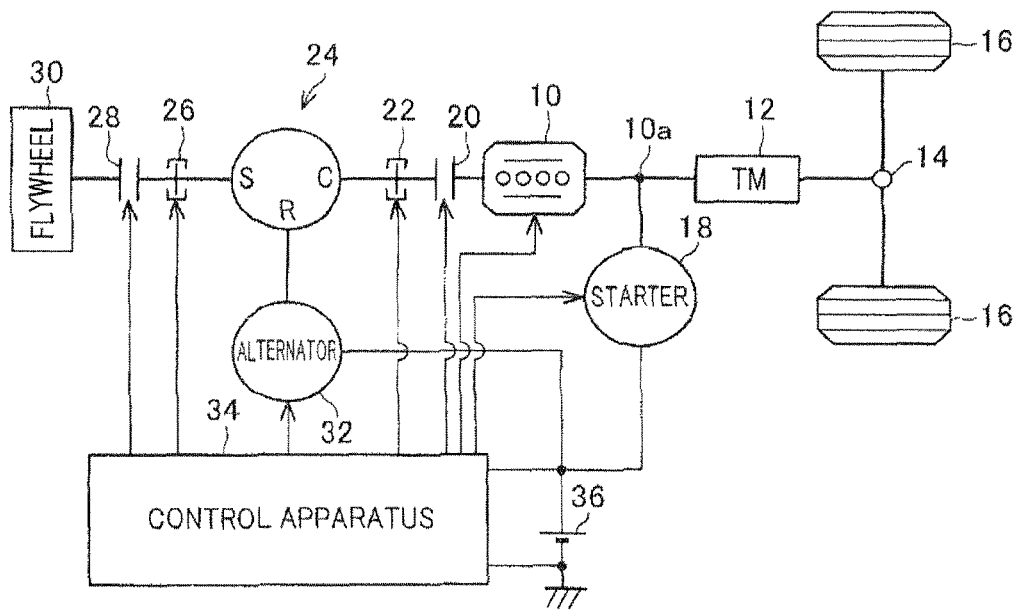
FIG. 1A is a diagram showing the structure of a power transmission system for use in a vehicle according to a first embodiment of the invention.

FIG. 1A is a diagram showing the structure of a power transmission system for use in a vehicle according to a first embodiment of the invention.

The first embodiment describes an application of the present invention to a vehicle having an internal combustion engine 10 as a single main engine thereof. A crankshaft 10a of the engine 10 is mechanically coupled to drive wheels 16 through a transmission 12 and a differential 14. The crankshaft 10a is provided with a starter 18 as a means to provide initial rotation to the crankshaft 10a.

Figure 1B:
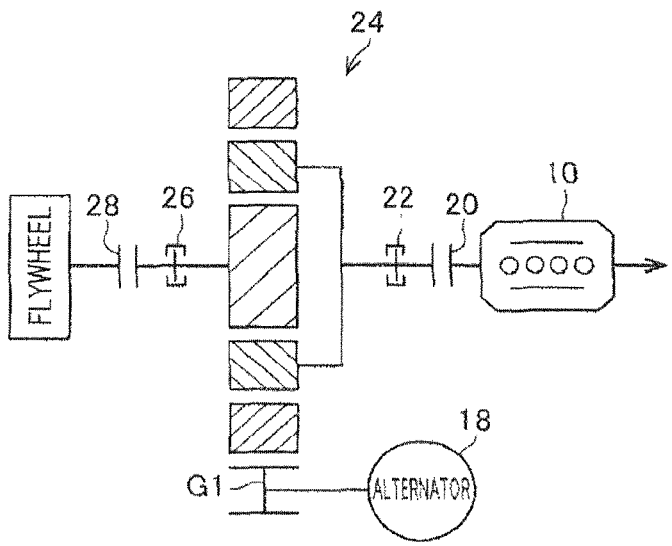
FIG. 1B is a diagram showing the cross-sectional structure of a power split device included in the power transmission system.

The crankshaft 10a is mechanically coupled to a power split device 24 through a clutch 20 and a locking device 22 at its end not coupled to the transmission 12. The power split device 24 includes a plurality of rotating bodies which rotate in conjunction with one another, and distribute power among the engine 10, the flywheel 30 and an alternator 32. In more detail, the power split device 24 is constituted of a single planetary gear device having a sun gear S mechanically coupled to the flywheel 30, a carrier C mechanically coupled to the engine 10, and a ring gear R mechanically coupled to the alternator 32. FIG. 1B shows the cross-sectional structure of the power split device 24.

The flywheel 30 serves as an energy storing means to store rotational energy inputted thereto as kinetic energy. The alternator 32, which serves as electric power generating means, has a function as a power source for vehicle-mounted accessories including the starter 18, and a function of discharging an auxiliary battery 36. The clutch 20 serves as an interruption means to interrupt power transmission between the engine 10 and the power split device 24 (carrier C) by disengaging the mechanical coupling between the engine 10 and the carrier C of the power split device 24. The locking device 22 is a device capable of inhibiting the carrier C as a rotating body coupled to the engine 10 to rotate. A locking device 26 is a device capable of inhibiting the sun gear S as a rotating body coupled to the flywheel 30 to rotate. A clutch 28 serves as an interruption means to interrupt power transmission between the flywheel 30 and the power split device 24 (sun gear S) by disengaging the mechanical coupling between the flywheel 30 and the sun gear S of the power split device 24.

A control apparatus 34 is for controlling the vehicle. For example, the control apparatus 34 controls a vehicle drive force by manipulating the engine 10, starter 18, clutch 20, locking devices 22 and 26, clutch 28, and alternator 32.

FIGS. 2A to 2F are collinear diagrams of the rotational speeds of the three rotating bodies (sun gear S, carrier C and ring gear R) of the power split device 24 controlled by the control apparatus 34 together with the rotational speed of the engine 10. In FIGS. 2A to 2F, the arrows indicate the directions of torque. In these figures, the direction of torque is positive when it points upward as well as the direction of the rotational speed. Accordingly, the rotational energy is defined to be positive when it enters the power split device 24. In the following, FIGS. 2A to 2F are explained in this order.

FIG. 2A showing a state in which the vehicle is stationary:

When the vehicle is stationary, and the rotational energy stored in the flywheel 30 is sufficient as shown in the section (i), this rotational energy is converted into electric energy by the alternator 32, and supplied to the auxiliary battery 36. At this time, the engine 10 is in the stopped state, and the clutch 20 shown in FIG. 1 is in the disengaged state. Accordingly, the carrier C is inhibited from rotating by the locking device 22. This is to apply torque to the carrier C as explained in detail below.

In the planetary gear device, when the torque of the sun gear S is Ts, the torque of the carrier C is Tc, the torque of the ring gear R is Tr, the following equations (c1) and (c2) hold.

$$Tr = -Tc/(1+\rho) \tag{c1}$$

$$Ts = -\rho Tc/(1+\rho) \tag{c2}$$

In the above equations, $\rho$ ($=Zs/Zr$) is the ratio of the gear number Zr of the ring gear R to the gear number Zs of the sun gear S. As seen from the above equations, when the locking device 22 is not in the locked state, since the torque Tc of the carrier C is 0, the ring gear R and the sun gear S are not applied with torque. As a result, torque transmission between the ring gear R and the sun gear S is disabled. On the other hand, when the carrier C is locked by the locking device 22, it is possible to control the rotational energy transmitted from the flywheel 30 to the alternator 32 by controlling the torque which the alternator 32 applies to the ring gear R. The rotational speeds of the sun gear S, carrier C and ring gear R are in a linear relationship. Accordingly, when the rotational speed of the carrier C is fixed at 0, the speed of the alternator 30 (ring gear R) is uniquely determined depending on the rotational speed of the flywheel 30 (sun gear S).

On the other hand, if the rotational speed of the flywheel 30 is 0 when the vehicle is stationary, all the three rotating bodies of the power split device 24 are in the stopped state as shown in the section (ii).

FIG. 2B showing a state in which the engine 10 is started:

When the rotational energy of the flywheel 30 is sufficient at the time of starting the engine 10 as shown in the section (i), an initial rotation is provided to the crankshaft 10a of the engine 10 using the rotational energy of the flywheel 30 without using the starter 18. At this time, power generation control of the alternator 32 is performed. This is for enabling power transmission through the power split device 24 in accordance with the above equations (c1) and (c2).

On the other hand, when the rotational energy of the flywheel 30 is insufficient at the time of starting the engine 10 as shown in the section (ii), the engine 10 is started using the starter 18. At this time, the power generation control of the alternator 32 is not performed. Accordingly, power transmission through the power split device 24 is not performed. The clutch 28 is put in the disengaged state, and the sun gear S is locked by the locking device 26 at this time. This is for preventing a difference in rotational speed between the input and the output of the clutch 28 from becoming excessive at the time of putting the clutch 28 in the engaged state. Alternatively, it is possible that the clutch 28 is put in the engaged state, and the locking device 26 is put in the unlocked state.

FIG. 2C showing a state in which the vehicle starts moving or running under light load:

When the rotational energy stored in the flywheel 30 is sufficient when the vehicle starts moving, or running under light load (EV-running) as shown in the section (i), the vehicle runs using the rotational energy of the flywheel 30 without using the engine 10. At this time, since the ring gear R is applied with torque by performing the power generation of the alternator 32, power transmission through the power split device 24 is enabled.

On the other hand, when the rotational energy stored in the flywheel 30 is insufficient as shown in the section (ii), the sun gear S is locked by the locking device 26, so that the vehicle runs by the drive power of the engine 10 while the power generation control of the alternator 32 is performed. The reason why the lock device 26 is used at this time is to enable power transmission through the power split device 24 in a state where the rotational energy of the engine 10 is prevented from being supplied to the flywheel 30, and also enable performing the power generation control of the alternator 32. If the locking device 26 is not used, part of the rotational energy of the engine 10 is supplied to the flywheel 30. Incidentally, when the power generation control of the alternator 32 is not performed, the sun gear S might not be locked by the locking device 26. This is because power transmission through the power split device 24 is disabled in this case.

FIG. 2D showing a state in which the vehicle runs steadily:

To store rotational energy in the flywheel 30 while the vehicle runs steadily as shown in the section (i), the alternator 32 is caused to generate power while the engine 10 runs. At this time, generating power by the alternator 32 is integral to transmit the rotational energy of the engine 10 to the flywheel 30 through the power split device 24.

On the other hand, when any of energy storing in the flywheel 30 and energy releasing from the flywheel 30 is not performed as shown in the section (ii), the vehicle runs by the drive force of the engine 10 with the sun gear S being locked by the locking device 26 while performing the power generation control of the alternator 32. The reason why the locking device 26 is used at this time is to enable power transmission through the power split device 24 in a state where the rotational energy of the engine 10 is prevented from being supplied to the flywheel 30, and also enable performing the power generation control of the alternator 32. Incidentally, when the power generation control of the alternator 32 is not performed, the sun gear S might not be locked by the locking device 26. This is because transmission through the power split device 24 is disabled in this case.

Further, when the energy stored in the flywheel 30 is converted into electric energy by the alternator 32 while the vehicle runs using the drive force of the engine 10 as shown in the section (iii), the power generation control of the alternator 32 is performed in a state where the carrier C is locked by the locking device 22. At this time, the clutch 20 is put in the disengaged state to interrupt power transmission between the engine 10 and the power split device 24. The reason why the carrier C is locked by the locking device 22 is to enable the rotational energy of the flywheel 30 to be transmitted to the alternator 32 through the power split device 24.

FIG. 2E showing a state in which the vehicle accelerates:

To use the rotational energy of the flywheel 30 in addition to the rotational energy of the engine 10 when the vehicle accelerates as shown in the section (i), the power generation control of the alternator 32 is performed. Performing the power generation control of the alternator 32 is necessary to transmit the rotational energy of the flywheel 30 through the power split device 24.

On the other hand, when the rotational energy of the flywheel 30 is not used as shown in the section (ii), the vehicle runs using the rotational energy of the engine 10 in a state where the sun gear S is locked by the locking device 26, and the power generation control of the alternator 32 is performed. The reason why the locking device 26 is used at this time is to enable energy transmission through the power split device 24. Accordingly, if the power generation control of the alternator 32 is stopped, the sun gear S might not be locked by the locking device 26.

FIG. 2F showing a state in which regeneration is performed:

During a regeneration period, the engine 10 is stopped, and the power generation control of the alternator 32 is performed. As a result, the rotational energy inputted to the carrier C is distributed to the flywheel 30 and the alternator 32 through respectively the sun gear S and the ring gear R.

The first embodiment described above provides the following advantages.

(1) This embodiment includes the clutch 20 which interrupts power transmission between the power split device 24 and the engine 10 when the rotational energy of the flywheel 30 is transmitted to the alternator 32 through the power split device 24 under condition where power transmission is performed between the engine 10 and the drive wheels 16 of the vehicle.

This makes it possible to effectively convert the rotational energy of the flywheel 30 into electric energy.

(2) This embodiment includes the locking device 22 which locks the carrier C coupled to the engine 10.

This enables transmission of rotational energy through the power split device 24 even when the clutch 20 is in the disengaged state 20.

(3) This embodiment includes the clutch 28 which disengages mechanical coupling between the sun gear S and the flywheel 30.

This makes it possible to interrupt power transmission between the power split device 24 and the flywheel 30.

(4) This embodiment includes the locking device 26 which locks the sun gear S coupled to the flywheel 30.

This enables power transmission through the power split device 24 even when the clutch 20 is in the disengaged state 20.

(5) The crankshaft 10a of the engine 10 is mechanically coupled to the power split device 24 at one end thereof not connected to the drive wheels 16. This makes it possible to simplify the system structure compared to a case where the power split device 24 is mechanically coupled in between the engine 10 and the drive wheels 16.

(6) This embodiment includes the power split device 24, and the alternator 32 as an electric rotating machine mechanically coupled to the power split device 24.

This makes it possible to increase energy usage efficiency in the vehicle having the engine 10 as its sole main engine.

Second Embodiment

Next, a second embodiment of the invention is described with particular emphasis on the difference with the first embodiment.

Figure 3:
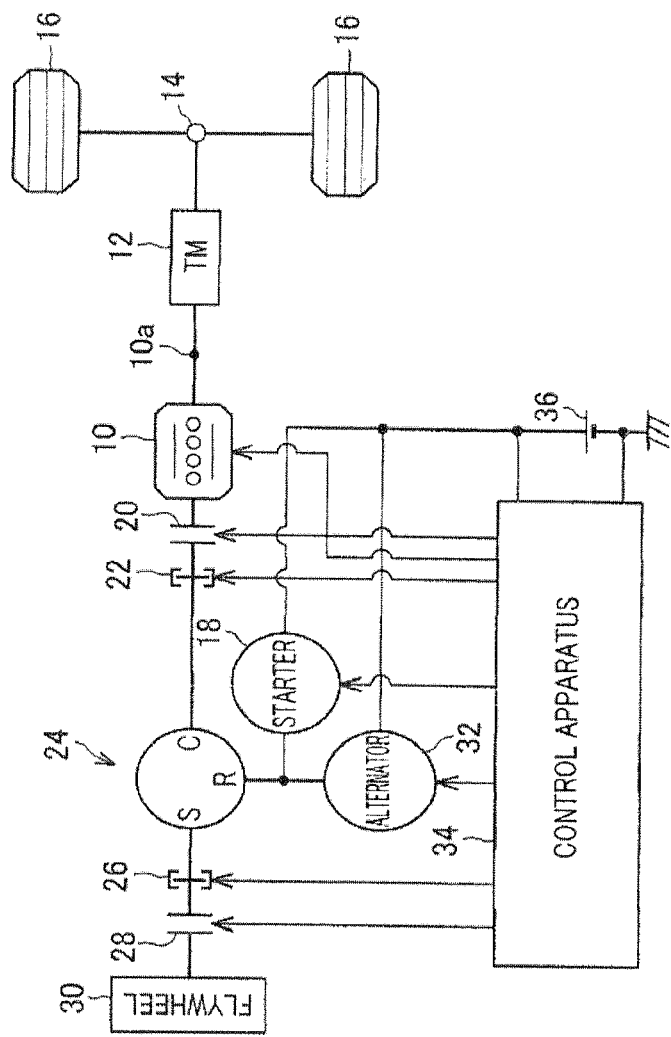
FIG. 3 is a diagram showing the structure of a power transmission system for use in a vehicle according to a second embodiment of the invention.

FIG. 3 is a diagram showing the structure of a power transmission system for use in a vehicle according to a second embodiment of the invention. In FIG. 3, the reference numerals identical to those in FIG. 1 represent the same elements.

As shown in FIG. 3, in this embodiment, the starter 18 is mechanically coupled to the ring gear R. When the engine 10 is started without using the rotational energy of the flywheel 30, this makes it possible to drive the starter 18 to provide an initial rotation to the engine 10 in a state where the sun gear S is locked by the locking device 26. The rotational speeds of the ring gear R and the carrier C are the same as those shown in the section (ii) of FIG. 2B.

The second embodiment provides the following advantage in addition to the advantages (1) to (6) provided by the first embodiment.

(7) The starter 18 is mechanically coupled to the ring gear R coupled to the alternator 32. As a result, since the rotational energy inputted to the ring gear R coupled to the alternator 32 can be made positive by putting the starter 18 into operation, it is possible to improve energy usage efficiency by expanding the possible rotational speed range of the ring gear R during energy regeneration, for example.

Third Embodiment

Next, a third embodiment of the invention is described with particular emphasis on the difference with the first embodiment.

Figure 4:
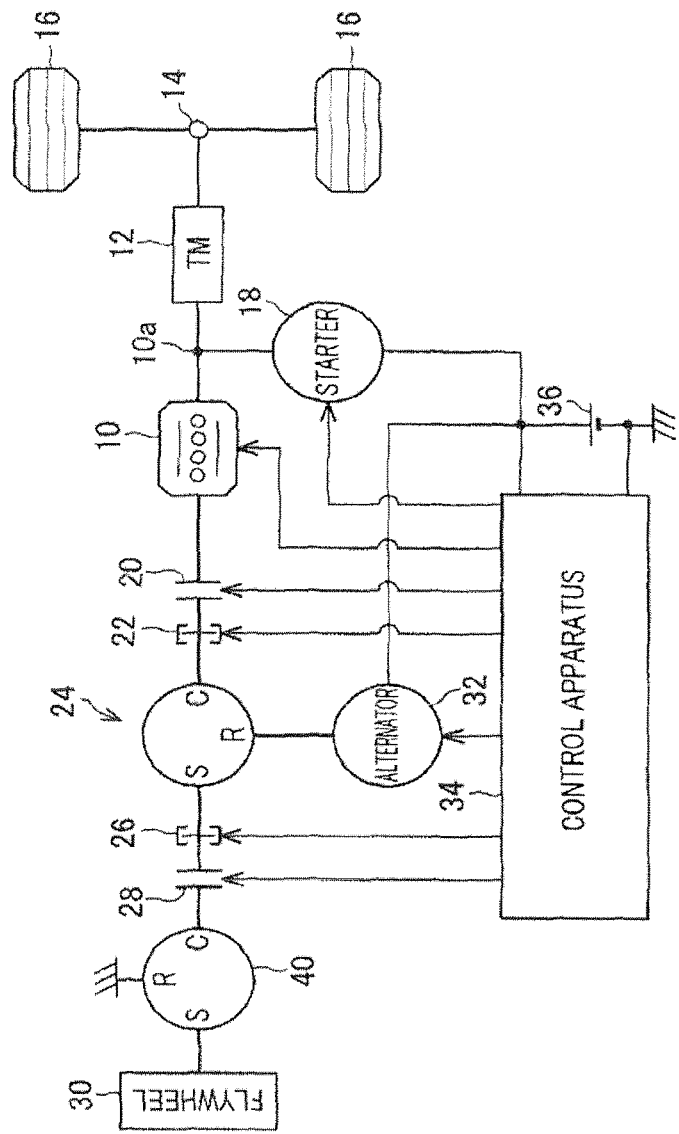
FIG. 4 is a diagram showing the structure of a power transmission system for use in a vehicle according to a third embodiment of the invention.

FIG. 4 is a diagram showing the structure of a power transmission system for use in a vehicle according to a third embodiment of the invention. In FIG. 4, the reference numerals identical to those in FIG. 1 represent the same elements.

As shown in FIG. 4, in this embodiment, between the power split device 24 and the flywheel 30, there is provided a step-up device 40 which increases the rotational speed of the power split device 24. The step-up device 40 is constituted of a planetary gear device whose carrier C is mechanically coupled to the power split device 24, whose sun gear S is mechanically coupled to the flywheel 30, and whose ring gear R is locked.

The third embodiment provides the following advantage in addition to the advantages (1) to (6) provided by the first embodiment.

(8) Between the ring gear R coupled to the flywheel 30 and the flywheel 30, there is interposed the step-up device 40. This makes it possible to make the flywheel 30 compact in size for the same energy storing capacity compared to the case where the step-up device 40 is not provided.

Fourth Embodiment

Next, a fourth embodiment of the invention is described with particular emphasis on the difference with the first embodiment.

Figure 5:
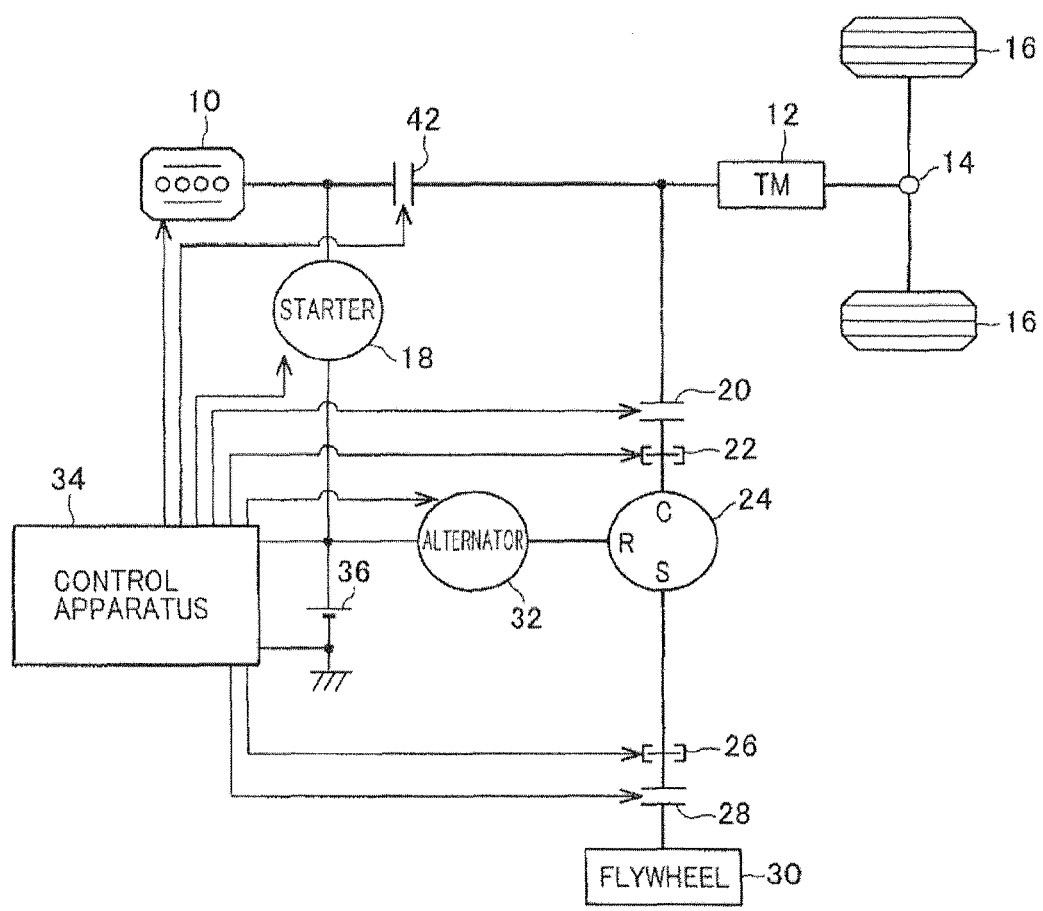
FIG. 5 is a diagram showing the structure of a power transmission system for use in a vehicle according to a fourth embodiment of the invention.

FIG. 5 is a diagram showing the structure of a power transmission system for use in a vehicle according to a fifth embodiment of the invention. In FIG. 5, the reference numerals identical to those in FIG. 1 represent the same elements.

As shown in FIG. 5, in this embodiment, the power split device 24 is mechanically coupled to the rotating shaft coupling the engine 10 to the transmission 12. In this embodiment, the power between the engine 10 and the drive wheels 16, the power of the flywheel 30 and the power of the alternator 32 are distributed by the power split device 24. Further, in addition to the clutch 20, there is disposed a clutch 42 which disengages mechanical coupling between the engine 10 and the transmission 12.

According to the fourth embodiment, other than the above advantages (1) to (6) provided by the first embodiment, the following advantage can be obtained.

(9) The power split device 24 is mechanically coupled in between the engine 10 and the drive wheels 16.

This makes it possible to transmit regenerated energy to the flywheel 30 or alternator 32 without through the engine 10.

Fifth Embodiment

Next, a fifth embodiment of the invention is described with particular emphasis on the difference with the first embodiment.

Figure 6:
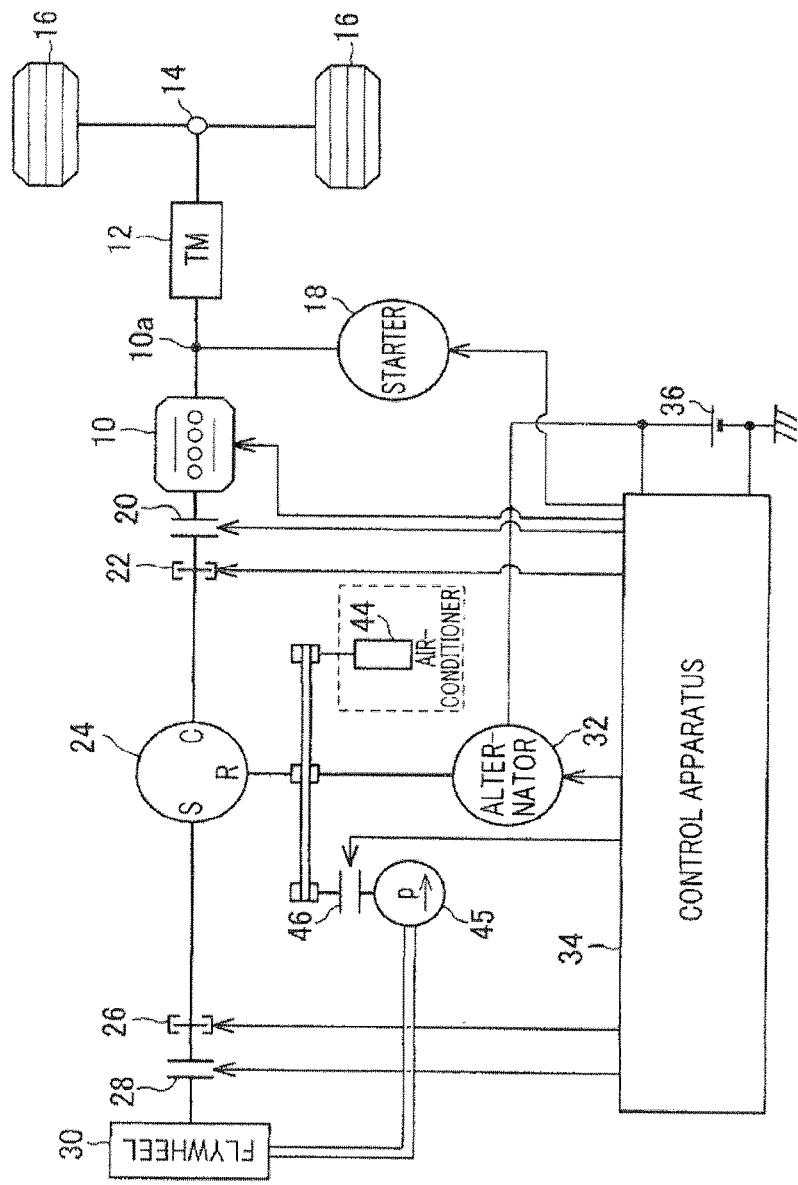
FIG. 6 is a diagram showing the structure of a power transmission system for use in a vehicle according to a fifth embodiment of the invention.

FIG. 6 is a diagram showing the structure of a power transmission system for use in a vehicle according to a fifth embodiment of the invention. In FIG. 6, the reference numerals identical to those in FIG. 1 represent the same elements.

As shown in FIG. 6, in this embodiment, the ring gear R coupled to the alternator 32 is further coupled to vehicle-mounted accessories. More precisely, the ring gear 32 is further mechanically coupled to a compressor 44 and a vacuum pump 45 of a vehicle air conditioner. The vacuum pump 45 is mechanically coupled to the ring gear R through a clutch 46. The vacuum pump 45 is for reducing the pressure in the space between the housing of the flywheel 30 and the ring gear R in order to reduce the air resistance which the flywheel 30 receives.

According to the above structure, it is possible to assist the torque which the alternator 32 applies to the ring gear R by the vacuum pump 45 when it is not possible to sufficiently transmit regenerative energy to the power split device 24 because of torque constraints of the alternator 32 although the regenerative energy is sufficiently large. Accordingly, according to the above structure, an amount of rotational energy inputted to the flywheel 30 per unit time can be increased.

Incidentally, when the torque required to be applied to the ring gear R. at the time of recovering regenerative energy is smaller than the maximum output torque of the alternator 32, the clutch 46 may be put into the disengaged state to interrupt power transmission from the power split device 24 to the vacuum pump 45.

According to the fifth embodiment, other than the above advantages (1) to (6) provided by the first embodiment, the following advantages can be obtained.

(10) The ring gear R coupled to the alternator 32 is coupled to vehicle-mounted accessories other than the alternator 32. This makes it possible to use the ring gear R as a drive power source for the vehicle-mounted accessories.

(11) The above vehicle-mounted accessories include the vacuum pump 45 to reduce the pressure inside the housing of the flywheel 30. This makes it possible to recover the regenerative energy more effectively.

Sixth Embodiment

Next, a sixth embodiment of the invention is described with particular emphasis on the difference with the first embodiment.

Figure 7:
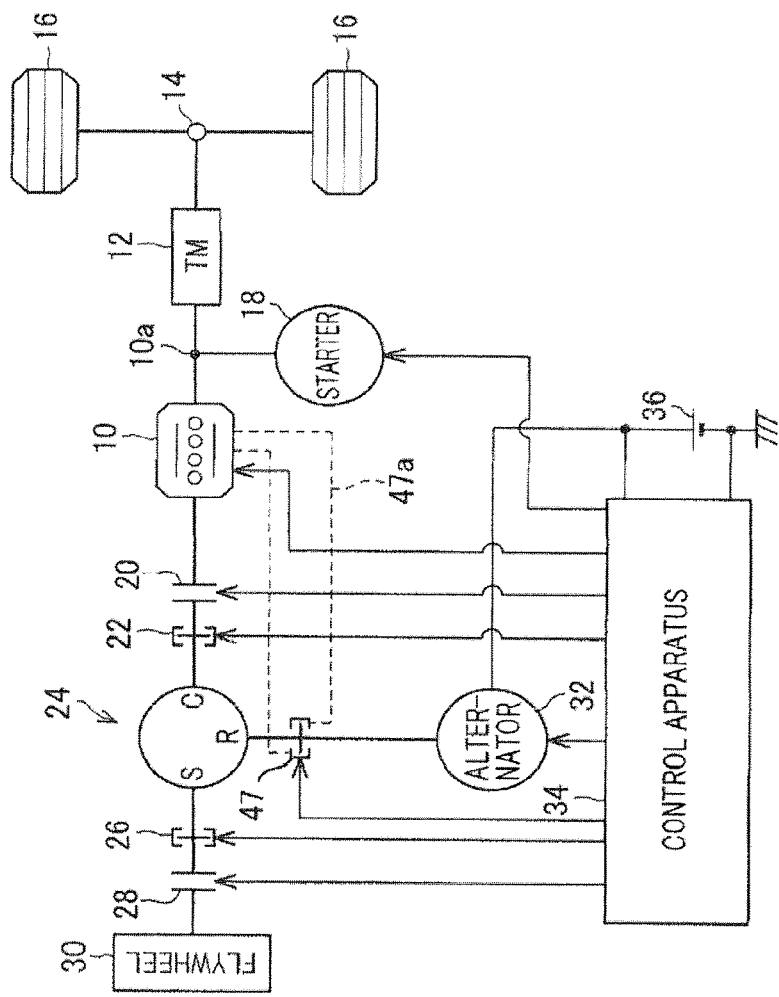
FIG. 7 is a diagram showing the structure of a power transmission system for use in a vehicle according to a sixth embodiment of the invention.

FIG. 7 is a diagram showing the structure of a vehicle power transmission system according to a sixth embodiment of the invention. In FIG. 7, the reference numerals identical to those in FIG. 1 represent the same elements.

As shown in FIG. 7, this embodiment includes a torque applying device 47 which applies torque to the ring gear R coupled to the alternator 32, and a thermal energy recovering system 47a to recover, by the cooling system of the engine 10, the thermal energy generated when the torque applying device 47 applies torque to the ring gear R. The torque applying device 47 may be a brake device constituted of a friction plate, for example.

According to the sixth embodiment, other than the above advantages (1) to (6) provided by the first embodiment, the following advantage can be obtained.

(12) This embodiment includes the torque applying device 47 which applies torque to the ring gear R coupled to the alternator 32. This makes it possible to supply regenerative energy to the flywheel 30 as necessary under condition where the power generation control of the alternator 32 cannot be performed, for example, when the auxiliary battery 36 is in the fully charged state.

(13) The thermal energy generated from the torque applying device 47 is recovered by the cooling system of the engine 10. This makes it possible to effectively use the large thermal energy generated when the power generation control of the alternator 32 is stopped during energy regeneration control, and the ring gear R coupled to the alternator 32 is applied with torque in the direction to stop the rotation of the ring gear R. This thermal energy can be used for space heating of the vehicle.

Seventh Embodiment

Next, a seventh embodiment of the invention is described with particular emphasis on the difference with the first embodiment.

Figure 8A:
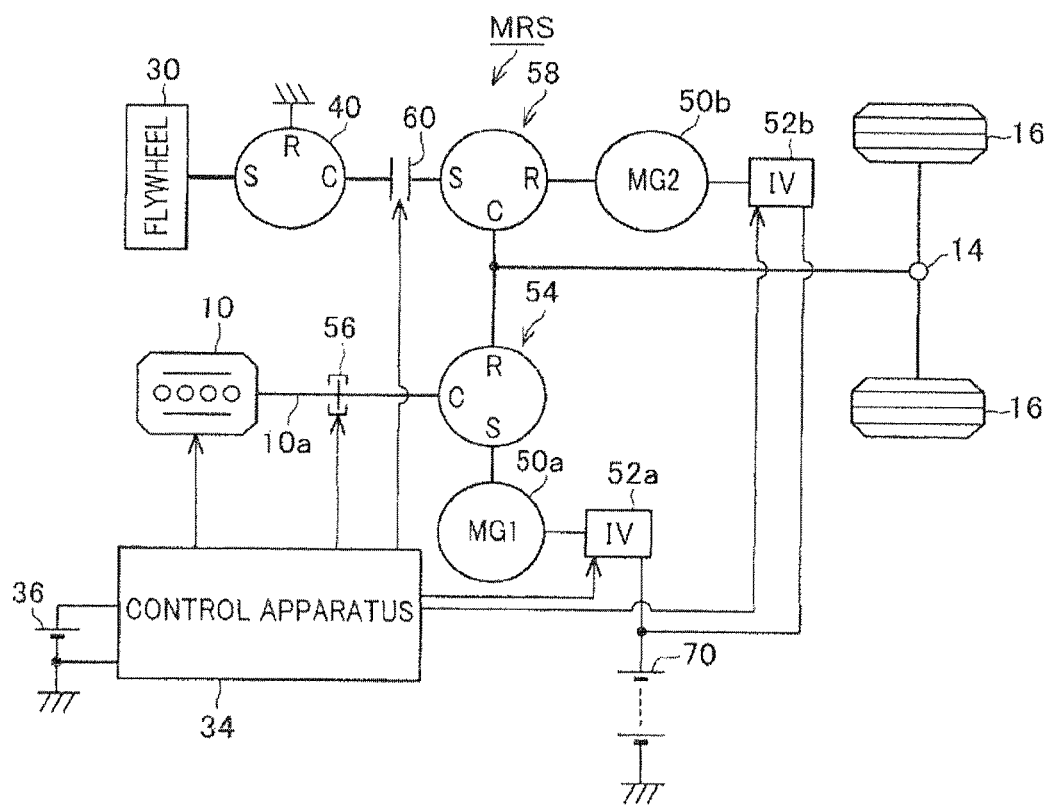
FIGS. 8A and 8B are diagrams showing the structure of a power transmission system for use in a vehicle according to a seventh embodiment of the invention.

FIG. 8A is a diagram showing the structure of a power transmission system for use in a vehicle according to a seventh embodiment of the invention. In FIG. 8A, the reference numerals identical to those in FIG. 1 represent the same elements.

This embodiment enables using recovered regenerative rotational energy as it is without converting the recovered rotational energy into electric energy by the provision of the flywheel 30.

As shown in FIG. 8A, in this embodiment, a first power split device 54 is mechanically coupled with the engine 10, a first motor-generator 50*a* and a second power split device 58. More specifically, the first power split device 54 is constituted of a planetary gear device whose sun gear S is mechanically coupled to the first motor-generator 50*a*, whose carrier C is mechanically coupled to the engine 10 through a locking device 56, and whose ring gear R is mechanically coupled to the second power split device 58. The ring gear R is mechanically coupled to the drive wheels 16 through the differential 14.

Figure 8B:
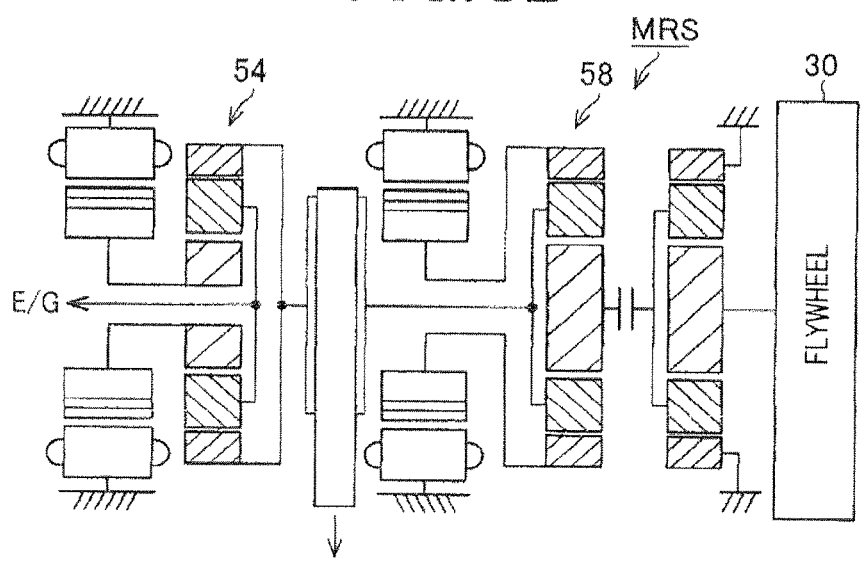

The second power split device 58 is mechanically coupled with a second motor-generator 50*b* and the flywheel 30 in addition to the first power split device 54. More specifically, the second power split device 58 is constituted of a planetary gear device whose sun gear S is mechanically coupled to the flywheel 30 through a clutch 60 and the step-up device 40, whose carrier C is mechanically coupled to the first power split device 54, and whose ring gear R is mechanically coupled to the second motor-generator 50*b*. FIG. 8B shows the cross-sectional structures of the first and second power split devices 54 and 58.

The first and second motor-generators 50*a* and 50 be are electrically connected to a high voltage battery 70 respectively through an inverter 52*a* and an inverter 52*b*. The voltage of the high voltage battery 70 (several hundred volts) is higher than the voltage of the auxiliary battery 36 (several volts to over ten volts). The control apparatus 34 controls control variables of the first and second motor-generators 50*a* and 50*b* by manipulating the inverters 52*a* and 52*b*. The first and second motor-generators 50*a* and 50*b*, the inverters 52*a* and 52*b*, and the high voltage battery 70 constitute a vehicle high voltage system insulated from the vehicle low-voltage system. Accordingly, the control apparatus 34 manipulates the inverters 52*a* and 52*b* through insulating means such as photocouplers.

The second power split device 58, the flywheel 30 and the second motor-generator 50*b* constitute a mechanical regenerative system MRS capable of storing rotational energy as it is without converting the rotating energy into electric energy. Replacing this system with the second motor-generator 50*b* makes a conventional system for a parallel-series hybrid vehicle.

FIGS. 9A to 9E are collinear diagrams of the rotational speeds of the three rotating bodies (sun gear R, carrier C and ring gear R) for each of the first and second power split devices 54 and 58 controlled by the control apparatus 34. In FIGS. 9A to 9E, the arrows indicate the directions of torque. In these figures, the direction of torque, as well as the rotational speed, is positive when it points upward. Accordingly, the rotational energy is defined to be positive when it enters the power split device. In the following, FIGS. 9A to 9E are explained in this order.

FIG. 9A showing a state in which the vehicle is stationary:

When the vehicle is stationary, the rotating bodies of the first power split device 54 are stationary. On the other hand, since the flywheel 30 stores rotational energy and its rotational speed is not 0, the rotational speed of the second motor-generator 50*b* is not 0 although it is in the non-drive state. This is because that the rotational speeds of the sun gear S, carrier C and ring gear R of the second power split device 58 are on a line in the collinear diagram, and the rotational speed of the carrier C coupled to the drive wheels 16 is brought to 0.

FIG. 9B showing a state in which the vehicle starts moving or runs under light load (EV-running):

In this case, the first motor-generator 50*a* and the engine 10 are put into the non-drive state, and the first power split device 54 does not contribute to transmission of rotational energy. During this state, the second motor-generator 50*b* operates as a motor, and the rotational energy of the second motor-generator 50*b* and the rotational energy of the flywheel 30 are supplied to the drive wheels 16.

FIG. 9C showing a state in which the vehicle runs steadily. During this state, the engine 10 is caused to run, the first motor-generator 50*a* is caused to operate as a generator, and the second motor-generator 50*b* is caused to operate as a motor. At this time, it is possible to control an amount of the rotational energy supplied from the flywheel 30 to the drive wheels 16 per unit time by the torque of the second-motor generator 50*b*. Incidentally, the first motor-generator 50*a* can be used as a motor at this time by bringing the rotational speed of the first motor-generator 50*a* to the negative area in the collinear diagram.

FIG. 9D showing a state in which the vehicle accelerates:

Also during this state, the engine 10 is caused to run, the first motor-generator 50*a* is caused to operate as a generator, and the second motor-generator 50*b* is caused to operate as a motor. At this time, the drive wheels 16 are driven mainly by the engine 10. However, they are assisted by the second motor-generator 50*b* and the flywheel 30 as necessary at this time. Incidentally, it is preferable to increase the amount of power generation of the first motor-generator 50*a* with the increase of the output of the second motor-generator 50*b* in order to supplement the power consumption of the high voltage battery 70.

FIG. 9E showing a state in which power is regenerated:

During this state, the first motor-generator 50*a* and the engine 10 are put into the non-drive state, and the first power split device 54 does not contribute to transmission of rotational energy. During this state, the second motor-generator 50*b* and the flywheel 30 recover the regenerative energy.

As described above, in this embodiment, in addition to that the regenerative energy is converted into electric energy by the second motor-generator 50*b*, it is stored in the flywheel 30 in its original form of rotational energy. Accordingly, according to this embodiment, the regenerative energy usage efficiency can be improved by using the rotational energy of the flywheel 30 as drive force when the vehicle starts moving later.

This is made possible by replacing the second motor-generator 50*b* with the mechanical regeneration system MRS. However, if there occurs power circulation in the mechanical regeneration system MRS, since energy loss increases, the energy usage efficiency may be lowered. Accordingly, in this embodiment, a specific process described in the following with reference to FIGS. 10 to 13 is performed.

FIG. 10A and FIG. 10B are collinear diagrams respectively showing an early-stage system state and a late-stage system state when regenerative control is performed. When the regenerative control continues, the system shifts from the state shown in FIG. 10A to the state shown in FIG. 10B. When the regenerative control continues, the rotational speed of the flywheel 30 continues to increase, while the rotational speed of the second-motor generator 50*b* continues to decrease. If the rotational speed of the second motor-generator 50*b* changes in sign, the second motor-generator 50*b* changes from the regenerative control mode to the power control mode. As a result, there occurs power circulation in which the rotational energy outputted from the second motor-generator 50b is stored in the flywheel 30.

To prevent the power circulation from occurring, the second motor-generator 50b is put into the non-drive state by lowering the rotational speed of the second motor-generator 50b below a specified speed NL when the rotational speed of the flywheel 30 is positive, and the first motor-generator 50a is put under regenerative control as shown in FIG. 10B. By putting the second motor-generator 50b into the non-drive state, the second power split device 58 stops contributing to power transmission. At this time, the carrier C of the first power split device 54 is locked by the locking device 56. This is to enable power transmission through the first power split device 54 while the engine 10 is in the non-drive state.

Figure 11:
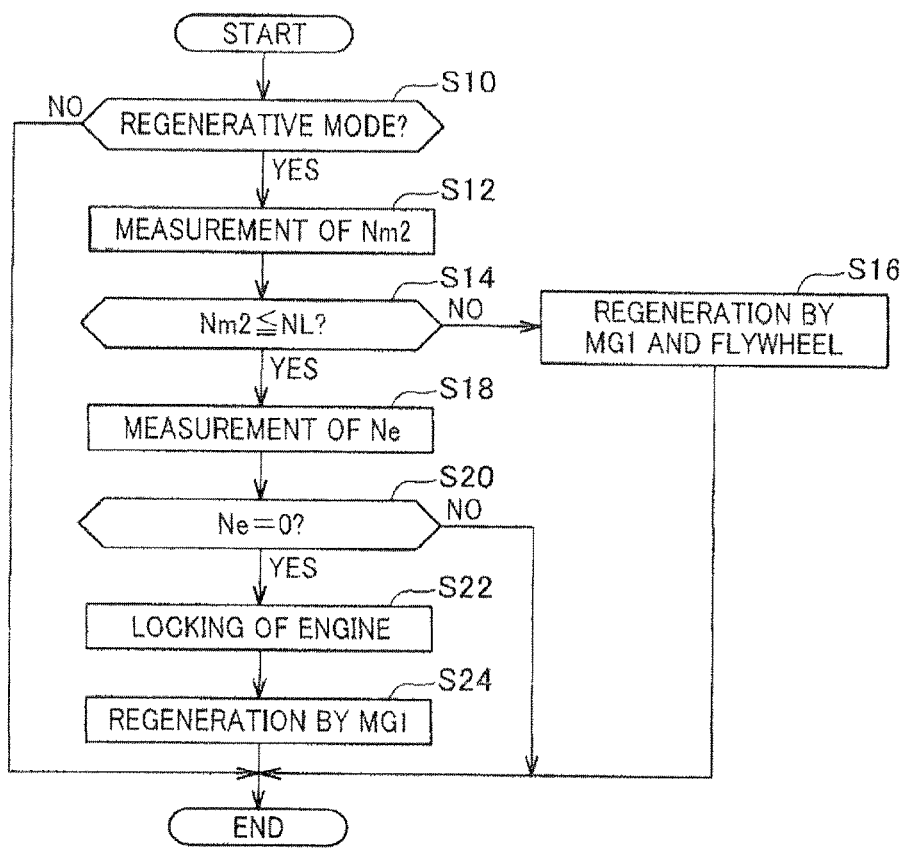
FIG. 11 is a flowchart showing a control process performed by the power transmission system of the seventh embodiment during the regenerative control mode.

FIG. 11 shows the process of the regenerative control in this embodiment. This process is repeatedly performed by the control apparatus 34 at regular time intervals.

This process begins by determining whether or not a regenerative mode prevails in step S10. If the determination result in step S10 is affirmative, the process proceeds to step S12 to measure the rotational speed Nm2 of the second motor-generator 50b. Subsequently, it is determined whether of not the measured rotational speed Nm2 is lower than or equal to the specified speed NL. This is for determining whether or not the power circulation occurs in the mechanical regeneration system MRS, causing the energy usage efficiency to be lowered. The specified speed NL is set to 0 or negative.

If the determination result in step S14 is negative, the process proceeds to step S16 where the first motor-generator 50a is put into the drive state to recover the regenerative energy by the flywheel 30, for example.

On the other hand, if the determination result in step S14 is affirmative, the process proceeds to step S18 to measure the rotational speed Ne of the engine 10. Subsequently, it is determined in step S20 whether or not the measured rotational speed Ne is 0. If the determination result in step S20 is affirmative, the process proceeds to step S22 to put the locking device 56 into the engaged state so that the first motor-generator 50b is put under the regenerative control in step S24.

If the determination result in step 810 or S20 is negative, or when step S16 or S24 is completed, the process is terminated.

FIGS. 12A and 12B are collinear diagrams showing a system state in an EV-running mode in which the vehicle runs without using the engine 10. When the vehicle runs using the rotational energy of the second motor-generator 50b and the flywheel 30, the rotational speeds of the second motor-generator 50b and the flywheel 30 changes from the ones shown in FIG. 12A to the ones shown in FIG. 12B. That is, the speeds of the second motor-generator 50b and the flywheel 30 decrease gradually while the vehicle runs using the rotational energy of the second motor-generator 50b and the flywheel 30. If the rotational speed of the second motor-generator 50b changes in sign thereafter, the second motor-generator 50b is put under the regenerative control, and there occurs the power circulation in which the rotational energy of the flywheel 30 is supplied to the second motor-generator 50b.

Accordingly, as shown in FIG. 128, the second motor-generator 50b is put into the non-drive state if the rotational speed of the second motor-generator 50b becomes lower than a specified speed Nmth. Further, the first motor-generator 50a is put under the power control to drive the vehicle.

Figure 13:
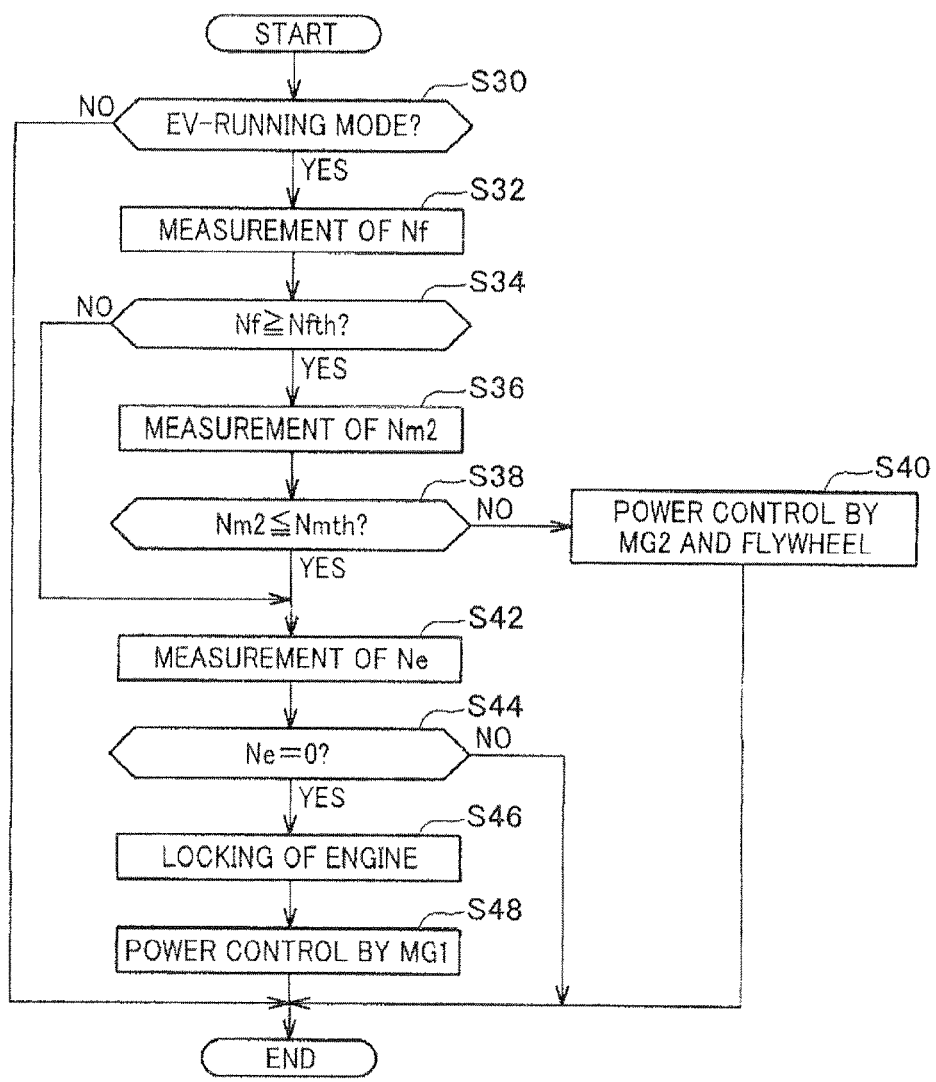
FIG. 13 is a flowchart showing a control process performed by the power transmission system of the seventh embodiment during the EV-running mode.

The above process is explained in the following with reference to the flowchart of FIG. 13. This process is performed by the control apparatus 34 at regular time intervals.

This process begins by determining whether or not the vehicle is running in the EV running mode in step S30. If the determination result in step S30 is affirmative, the process proceeds to step S32 to measure the rotational speed Nf of the flywheel 30. Subsequently, it is determined in step S34 whether or not the measured rotational speed Nf is higher than or equal to a specified speed Nfth. Step S34 is for determining whether or not the rotational energy of the flywheel 30 is sufficient to drive the vehicle. If the determination result in step S34 is affirmative, the process proceeds to step S36 to measure the rotational speed Nm2 of the second motor-generator 50b. Subsequently, it is determined in step S38 whether or not the measured rotational speed Nm2 is lower than or equal to the specified value Nmth. Step S38 is for determining whether or not the energy usage efficiency decreases if the second motor-generator 50b is driven. If the determination result in step S38 is negative, the process proceeds to step S40 to drive the second motor-generator 50b to use the rotational energy of the flywheel 30 as vehicle driving energy.

On the other hand, if the determination result in step S38 is affirmative, the process proceeds to step S42 to measure the rotational speed Ne of the engine 10. Subsequently, it is determined in step S44 whether or not the measured rotational speed Ne is 0. If the determination result in step S44 is affirmative, the process proceeds to step 546 to put the locking device 56 in the engaged state. Thereafter, the process proceeds to step S48 to perform the power control by the first motor-generator 50a.

If the determination result in step S30 or S44 is negative, or when step S40 or 548 is completed, the process is terminated.

The system states in this embodiment are not limited to the ones described with reference to FIGS. 9A to 9E. There are other system states shown in FIGS. 14A to 14E explained in the following, for example.

FIG. 14A showing a state in which the vehicle has been stopped for a long time:

In this case, to prevent the rotational energy of the flywheel 30 from gradually decreasing, the second motor-generator 50 b is put under the regenerative control. At this time, the carrier C of the second power split device 58 is locked because the brake is being applied and the drive wheels 16 are locked.

FIG. 14B showing a state in which the vehicle is stopped with the remaining capacity (SOC) of the high voltage battery 70 being small:

In this case, the engine 10 is put into the drive state, and the rotational energy of the engine 10 is recovered through the regenerative control of the first motor-generator 50a. The thus recovered energy is used to charge the high voltage battery 70. However, when the remaining capacity of the auxiliary battery 36 is small, the recovered energy may be used to charge the auxiliary battery 36 through a step-down converter 36 (not shown).

FIG. 14C showing a state in which the rotational energy of the flywheel 30 is not sufficient to start the engine 10:

In this case, the first motor-generator 50a is put under the power control in order to provide an initial rotation to the crankshaft 10a of the engine 10.

FIG. 14D showing a state in which the vehicle runs backward:

In this case, the first motor-generator 50a is put under the power control in a state where the engine 10 is stopped, and the carrier C of the first power split device 54 is locked by the locking device 56. As a result, the rotational speed of the ring gear R of the first power split device 54 can be made equal to the speed of the drive wheels 16 rotating reversely.

The seventh embodiment described above provides the following advantages.

(14) The second motor-generator 50b mounted on a parallel-series hybrid vehicle, which operates to distribute the powers of the first and second motor-generators 50a and 50b and the engine 10, is replaced by the mechanical regeneration system MRS. This makes it possible to improve the usage efficiency of the regenerative energy, because the regenerative energy can be stored in its original form of mechanical energy.

(15) There is provided the locking device 56 to lock the carrier C coupled to the engine 10. This enables power transmission through the first power split device 54 even when the engine 10 is in the non-operating state.

(16) If the power circulation occurs between the flywheel 30 and the second motor generator 50b, the second motor-generator 50b is stopped, and the regenerative control is performed using the first motor-generator 50a in a state where the carrier C of the first power split device 54 is locked by the locking device 56. This makes it possible to suppress the energy usage efficiency from being lowered.

(17) When the vehicle runs in the EV-running mode, it is determined whether or not the second motor-generator 50b should be driven based on the rotational speed of the flywheel 30. This makes it possible to effectively use the rotational energy of the flywheel 30.

(18) If the power circulation occurs between the flywheel 30 and the second motor generator 50b when the vehicle runs in the EV-running mode, the second motor-generator 50b is stopped, and the regenerative control is performed using the first motor-generator 50a in a state where the carrier C of the first power split device 54 is locked by the locking device 56. This makes it possible to suppress the energy usage efficiency from being lowered.

(19) There is provided the clutch 60 to disengage the mechanical coupling between the sun gear S and the flywheel 30. This makes it possible to interrupt power transmission between the second power split device 58 and the flywheel 30.

(20) Between the sun gear S and the flywheel 30, there is interposed the step-up device 40. This makes it possible to make the flywheel 30 compact in size compared to the case where the step-up device 40 is not interposed for the same energy storing capacity.

Modifications of the First to Sixth Embodiments

Regarding the configuration of the mechanical coupling between the power split device 24 and the flywheel 30: In each of the above embodiments, the flywheel 30, engine 10 and alternator 32 are respectively mechanically coupled with the sun gear S, carrier C and ring gear R of the power split device 24 constituted of a planetary gear device. However, the configuration of the mechanical coupling between the power split device 24 and the flywheel 30 may be such that the alternator 32, engine 10 and flywheel 30 are respectively mechanically connected with the sun gear S, carrier C and ring gear R of the power split device 24 constituted of a planetary gear device.

Regarding the structure of the power split device 24:

The power split device 24 is not limited to the one constituted of a single planetary gear device. For example, it may be constituted of the first power distributing device 54 shown in FIG. 8 and the second power distributing device 58 shown in FIG. 8. Also in this case, if a clutch is disposed between the first and second power distributing devices 54 and 58, the same advantage as the above described advantage (1) provided by the first embodiment can be provided. For another example, it may be constituted of a pair of power split devices, two of the sun gear, carrier and ring gear of one of the power split devices being respectively mechanically coupled to two of the sun gear, carrier and ring gear of the other power distributing device. In this case, there exist four rotating bodies having different rotational speeds on the collinear diagram, and three of them are coupled respectively to the flywheel 30, engine 10 and alternator 32.

Alternatively, two of the four rotating bodies may be respectively coupled to different alternators or different flywheels. In this case, by coupling the rotating bodies of a specific one of the planetary gear devices to a flywheel and two alternators, it becomes possible to transmit power between the flywheel 30 and the alternators even when the lock device 22 is not provided. Further, in the case where the three of the four rotating bodies of the specific planetary gear device are respectively coupled to the engine 10 and the different alternators, it is possible to transmit power between the engine 10 and the alternators through the power split device even when the lock device 26 is not provided.

The power split device 24 is not limited to the one constituted of a planetary gear device. For example, it may be constituted of a differential gear device.

Regarding the vehicle-mounted accessories driven by the power split device 24:

Such accessories are not limited to the compressor 44 and vacuum pump 45 of the vehicle air conditioner. For example, only one of the compressor 44 and vacuum pump 45 may be driven by the power split device 24. A water pump to circulate the cooling water of the engine 10 may be driven by the power split device 24. Further, an oil pump to circulate lubricating oil may be driven by the power split device 24.

Regarding the electric rotating machines whose outputs are distributed by the power split device 24:

Such electric rotating machines are not limited to the alternator 32 and the starter 18. Such electric rotating machines may include a motor-generator. In this case, the motor-generator maybe put below the power control at the time of starting the engine, running in the EV-running mode, accelerating the vehicle, or regenerating energy. Preferably, such a motor generator is applied with the voltage of the vehicle-mounted high voltage battery insulated from the auxiliary battery 36.

Other Modifications

The first to fourth and sixth embodiments may be modified such that the transmission 12 is disposed between the engine 10 and the power split device 24.

The third to sixth embodiments may be modified in the same way in which the second embodiment is modified from the first embodiment.

The fourth to sixth embodiments may be modified in the same way in which the third embodiment is modified from the first embodiment.

The fifth and sixth embodiments may be modified in the same way in which the fourth embodiment is modified from the first embodiment.

The sixth embodiment may be modified in the same way in which the fifth embodiment is modified from the first embodiment.

The first embodiment can provide the foregoing advantage (1) even when it does not include the clutch 28.

The section (i) of FIG. 2A shows the case where the alternator 32 converts the rotational energy stored in the flywheel 30 into electric energy when the vehicle is stationary. However, when it is expected that the vehicle will start before long, the rotational energy stored in the flywheel 30 is not necessary to be converted into electric energy by the alternator 32 in order to use the rotational energy of the flywheel 30 as driving force of the drive wheels 16 while preventing occurrence of energy loss due to conversion of the rotational energy to electric energy.

Incidentally, the condition where it is preferable not to perform the power generation control of the alternator 32 when the vehicle is stationary includes the one in which the engine is automatically stopped by idle-stop control.

Modifications of the Seventh Embodiment

Regarding the configuration of the coupling between the second power split device 58 and the flywheel 30:

The seventh embodiment may be modified such that the sun gear S is coupled to the second motor-generator 50b, and the ring gear R is coupled to the flywheel 30. Regarding the configuration of the coupling between the first power split device 54 and the first motor-generator 50a: The seventh embodiment may be modified such that the sun gear S is coupled to the second power split device 58, and the ring gear R is coupled to the first motor-generator 50a.

Regarding the first and second power split devices 54 and 58:

They are not limited to the one constituted of a planetary gear device. For example, they may be constituted of a differential gear.

Between the clutch 60 and the second power split device 58, a locking device may be disposed in order to enable power transmission through the second power split device 58 under condition that the flywheel 30 is inhibited to rotate.

The clutch 60 might not be provided.

The step-up device might not be provided.

Between the first and second power split devices 54 sand 58, a clutch may be disposed.

The carrier C of the first power split device 54 may be locked by the locking device 56 in the early stage of the regenerative control shown in FIG. 10A in order to prevent the engine 10 from rotating together with the carrier C of the first power split device 54.

The carrier C of the first power split device 54 may be locked by the locking device 56 in the early stage of the EV-running mode shown in FIG. 12A in order to prevent the engine 10 from rotating together with the carrier C of the first power split device 54.

Common Modifications of the First to Seventh Embodiments

Regarding the speed step-up means:

The speed step-up means constituted of a single planetary gear device is not limited to the one in which the ring gear R is locked. For example, it may be the one in which the carrier C is locked. In this case, it is preferable to couple the flywheel to the sun gear.

Further, the speed step-up means is not limited to the one constituted of a single planetary gear device. For example, it may be the one constituted of a single differential gear.

Regarding the planetary gear device:

The planetary gear device is not limited to the one in which the rotational speed of the ring gear R and the rotational speed of the sun gear S have to be different from each other in sign to satisfy the condition that the rotational speed of the carrier C is 0 when the rotational speeds of the ring gear R and the sun gear S are not 0. It may be the one in which the condition can be satisfied when the rotational speed of the ring gear R and the rotational speed of the sun gear S are the same in sign. Such a planetary gear device is known as "double planetary gear device". For example, refer to Japanese Patent Application Laid-Open No. 2001-108073.

The above explained preferred embodiments are exemplary of the invention of the present application which is described solely by the claims appended below. It should be understood that modifications of the preferred embodiments may be made as would occur to one of skill in the art.

What is claimed is:

1. A power transmission system for use in a vehicle comprising:
a power split device to perform power distribution among a flywheel for storing rotational energy as mechanical energy, an internal combustion engine and an electric rotating machine; and
an interrupting device to interrupt power transmission between a group of the flywheel and the electric rotating machine and a group of the internal combustion engine and drive wheels of the vehicle when rotational energy stored in the flywheel is transmitted to the electric rotating machine through the power split device under condition that power is transmitted between the internal combustion engine and the drive wheels,
wherein the power split device is mechanically coupled to a coupler between the internal combustion engine and the drive wheels, and
a transmission is interposed between the internal combustion engine and the drive wheels.

2. A power transmission system for use in a vehicle comprising:
a power split device to perform power distribution among a flywheel for storing rotational energy as mechanical energy, an internal combustion engine and an electric rotating machine; and
an interrupting device to interrupt power transmission between a group of the flywheel and the electric rotating machine and a group of the internal combustion engine and drive wheels of the vehicle when rotational energy stored in the flywheel is transmitted to the electric rotating machine through the power split device under condition that power is transmitted between the internal combustion engine and the drive wheels,
wherein the power split device includes a first rotating body mechanically coupled to the flywheel, a second rotating body mechanically coupled to the internal combustion engine, and a third rotating body mechanically coupled to the electric rotating machine, rotational torques of the first to third rotating bodies being in a linear relationship, and
wherein the power split device is a planetary gear device including a sun gear as the first rotating body, a carrier as the second rotating body and a ring gear as the third rotating body.

3. A power transmission system for use in a vehicle comprising:
a first power split device including a first rotating body mechanically coupled to a first electric rotating machine, a second rotating body mechanically coupled to drive wheels of the vehicle and a third rotating body mechanically coupled to an internal combustion engine of the vehicle, and configured to perform power distribution among the first electric rotating machine, the drive wheels and the internal combustion engine; and
a second power split device including a fourth rotating body mechanically coupled to a flywheel for storing rotational energy as mechanical energy, a fifth rotating body mechanically coupled to a second electric rotating machine, and a sixth rotating body mechanically coupled to one of the first to third rotating bodies of the first power split device to perform power distribution among the flywheel, the second electric rotating machine and the first power split device.

4. The power transmission system according to claim 3, wherein torques of the first to third rotating bodies are in a linear relationship, and the first power split device further includes a rotation restricting device to restrict the third rotating body from rotating.

5. The power transmission system according to claim 4, further comprising a determining section to determine whether the second rotating machine should be driven based on rotational speed of the flywheel when the vehicle runs without using power of the internal combustion engine.

6. The power transmission system according to claim 5, wherein the determining section determines that the second electric rotating machine should not be driven when there is a possibility of occurrence of power circulation between the second electric rotating machine and the flywheel.

7. The power transmission system according to claim 6, wherein torques of the first to third rotating bodies are in a linear relationship, and the power transmission system is configured to perform power control of the first electric rotating machine in a state where the third rotating body is restricted from rotating by the rotation restricting section if the determining section determines that the second electric rotating machine should not be driven.

8. The power transmission system according to claim 4, configured to perform power generation control of the first electric rotating machine in a state where the third rotating body is restricted from rotating by the rotation restricting device when power circulation occurs between the flywheel and the second electric rotating machine during deceleration regeneration of the vehicle.

9. The power transmission system according to claim 8, further comprising a determining section to determine whether the second rotating machine should be driven based on rotational speed of the flywheel when the vehicle runs without using power of the internal combustion engine.

10. The power transmission system according to claim 9, wherein the determining section determines that the second electric rotating machine should not be driven when there is a possibility of occurrence of power circulation between the second electric rotating machine and the flywheel.

11. The power transmission system according to claim 10, wherein torques of the first to third rotating bodies are in a linear relationship, and the power transmission system is configured to perform power control of the first electric rotating machine in a state where the third rotating body is restricted from rotating by the rotation restricting device if the determining section determines that the second electric rotating machine should not be driven.

12. The power transmission system according to claim 3, further comprising a clutch to disengage mechanical coupling between the flywheel and the fourth rotating body.

* * * * *